(No Model.)

S. M. STEVENSON.
TRACE FASTENER.

No. 373,251. Patented Nov. 15, 1887.

WITNESSES:
O. D Mott
C. Sedgwick

INVENTOR:
S. M. Stevenson
BY Munn & Co
ATTORNEYS.

UNITED STATES PATENT OFFICE.

SAMUEL MAHAN STEVENSON, OF BASTROP, LOUISIANA.

TRACE-FASTENER.

SPECIFICATION forming part of Letters Patent No. 373,251, dated November 15, 1887.

Application filed August 23, 1887. Serial No. 247,661. (No model.)

*To all whom it may concern:*

Be it known that I, SAMUEL MAHAN STEVENSON, of Bastrop, in the parish of Morehouse and State of Louisiana, have invented a new and Improved Trace-Fastener for Singletrees, of which the following is a specification, reference being had to the annexed drawings, forming a part thereof, in which—

Figure 1:
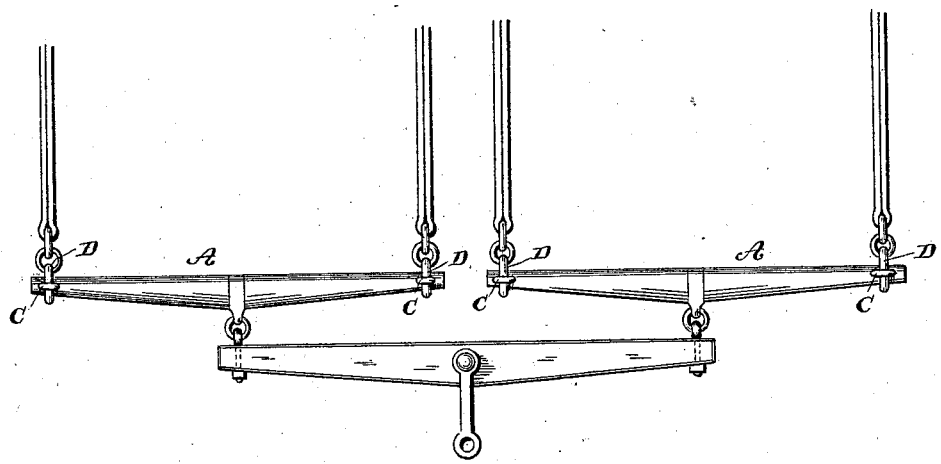
Figure 2:
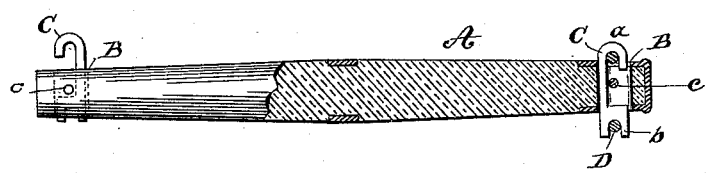
Figure 3:
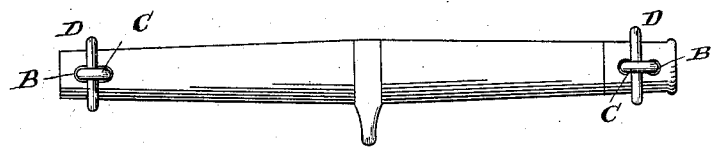
Figure 4:

Figure 1 is a plan view showing a pair of my improved singletrees connected with a doubletree. Fig. 2 is a side elevation, partly in section, of the singletree. Fig. 3 is a plan view, and Fig. 4 is a side elevation, of the trace-ring.

Similar letters of reference indicate corresponding parts in all the figures.

The object of my invention is to provide a simple and safe trace-holder for singletrees.

My invention consists in the combination, with a singletree mortised vertically through each end, of a retaining-bolt having a hook upon one end and a fork upon the other for engaging the ring of the trace.

The singletree A is provided near opposite ends with vertical mortises B, to which are fitted the sliding fasteners C. Each fastener consists of a hook, $a$, having the end of its shank enlarged, forming a fork, $b$. The fastener C is retained in its place in the mortise B in the singletree by a pin, $c$, extending through the mortise.

The fastener C is capable of sliding vertically sufficiently to allow the trace-ring D to slip over the end of the singletree and enter the hook $a$, when the fastener is allowed to drop into its place, bringing the hook $a$ down upon the ring at the top of the singletree and carrying the fork $b$ down upon the under part of the ring, as shown in Fig. 2.

Where the end of the singletree is supplied with a ferrule or cap the said ferrule or cap is provided with apertures corresponding in size and position with the upper and lower ends of the mortise B.

Arranged in the manner described the draft is upon the singletree, and the fastener is subjected to very little wear or strain, as its only office is to retain the trace-ring in its place on the end of the singletree.

Having thus fully described my invention, I claim as new and desire to secure by Letters Patent—

1. The combination, with a singletree provided with a transverse mortise, B, of a fastener formed of the hook $a$, having an enlarged shank provided with a fork, $b$, and the trace-ring D, adapted to the hook $a$, substantially as described.

2. The combination, with the singletree A, provided with the mortise B, of the fastener C, formed of the hook $a$, having an enlarged shank provided with a fork, $b$, the transverse pin $c$, and the trace-ring D, substantially as described.

SAMUEL MAHAN STEVENSON.

Witnesses:
R. R. ROSS,
G. W. HAFF.